(12) United States Patent
Kontermann et al.

(10) Patent No.: US 12,384,200 B2
(45) Date of Patent: Aug. 12, 2025

(54) DRIVE AXLE FOR A MOTOR VEHICLE

(71) Applicant: ZF Friedrichshafen AG, Friedrichshafen (DE)

(72) Inventors: Peter Kontermann, Osnabrück (DE); Frank Berger, Lübbecke (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 898 days.

(21) Appl. No.: 17/155,451

(22) Filed: Jan. 22, 2021

(65) Prior Publication Data

US 2021/0229493 A1    Jul. 29, 2021

(30) Foreign Application Priority Data

Jan. 24, 2020   (DE) .................... 10 2020 200 869.8

(51) Int. Cl.
 *B60B 35/12*   (2006.01)
 *B60B 35/00*   (2006.01)
 *B60K 1/00*    (2006.01)
 *B62D 5/04*    (2006.01)

(52) U.S. Cl.
 CPC .......... *B60B 35/128* (2013.01); *B60B 35/003* (2013.01); *B62D 5/0421* (2013.01); *B62D 5/0445* (2013.01); *B60K 2001/001* (2013.01)

(58) Field of Classification Search
 CPC ... B60B 35/128; B60B 35/003; B62D 5/0421; B62D 5/0445; B62D 5/0424; B62D 21/11; B60K 2001/001; B60K 1/00
 See application file for complete search history.

(56) References Cited

U.S. PATENT DOCUMENTS

| 3,779,581 A | 12/1973 | Scheuerpflug |
| 6,039,143 A * | 3/2000 | Kielar ............... B62D 5/0421 |
| | | 180/444 |
| 9,156,312 B1 * | 10/2015 | Ruggeri ............... B60B 35/122 |
| 10,589,589 B2 | 3/2020 | Buchwitz et al. |

(Continued)

FOREIGN PATENT DOCUMENTS

| DE | 2 101 504 A1 | 7/1972 |
| DE | 103 23 732 A1 | 12/2004 |

(Continued)

OTHER PUBLICATIONS

Paul Sakalas, What is a Transaxle and how is it Different than a Transmission, Oct. 20, 2017, On All Cylinders, Tech Articles (Year: 2017).*

(Continued)

*Primary Examiner* — Valentin Neacsu
*Assistant Examiner* — Abigail R Hymel
(74) *Attorney, Agent, or Firm* — Finch & Maloney PLLC

(57) ABSTRACT

A drive axle (1) and a motor vehicle having the drive axle (1) are proposed. The drive axle (1) includes an axle body (2) in which at least one axle shaft (3) extends. The drive axle (1) has at least one wheel carrier (5), which is arranged on a wheel-side end (4) of the axle body (2), and at least one steering assembly (6). The drive axle (1) is preferably in the form of a rigid axle and the axle body (2) has a receiving structure (7) for accommodating a drive unit (8), and the steering assembly (6) is directly connected to the axle body (2).

20 Claims, 1 Drawing Sheet

(56) References Cited

U.S. PATENT DOCUMENTS

| | | | | |
|---|---|---|---|---|
| 2005/0082780 | A1* | 4/2005 | Seeds | B62D 7/18 |
| | | | | 280/93.512 |
| 2014/0090917 | A1* | 4/2014 | Despres-Nadeau | F16D 3/223 |
| | | | | 464/145 |
| 2017/0341503 | A1* | 11/2017 | Idelevitch | F16D 3/065 |
| 2017/0369097 | A1* | 12/2017 | Umemoto | B60G 9/02 |
| 2019/0016372 | A1* | 1/2019 | Kimura | B62D 5/0454 |
| 2019/0023152 | A1* | 1/2019 | Hintzen | F16H 48/36 |

FOREIGN PATENT DOCUMENTS

| | | | | |
|---|---|---|---|---|
| DE | 603 00 118 T2 | 10/2005 | | |
| DE | 10 2015 212 811 A1 | 1/2017 | | |
| DE | 10 2018 120 916 A1 | 2/2019 | | |
| DE | 10 2017 216 658 A1 | 3/2019 | | |
| DE | 10 2019 002 655 A1 | 10/2019 | | |
| WO | WO-2016184607 A1 * | 11/2016 | | B60B 35/14 |
| WO | WO-2017106620 A1 * | 6/2017 | | B60B 35/122 |
| WO | WO-2019062864 A1 * | 4/2019 | | |

OTHER PUBLICATIONS

German Office Action Corresponding to 10 2020 200 869.8 mailed Aug. 3, 2020.

* cited by examiner

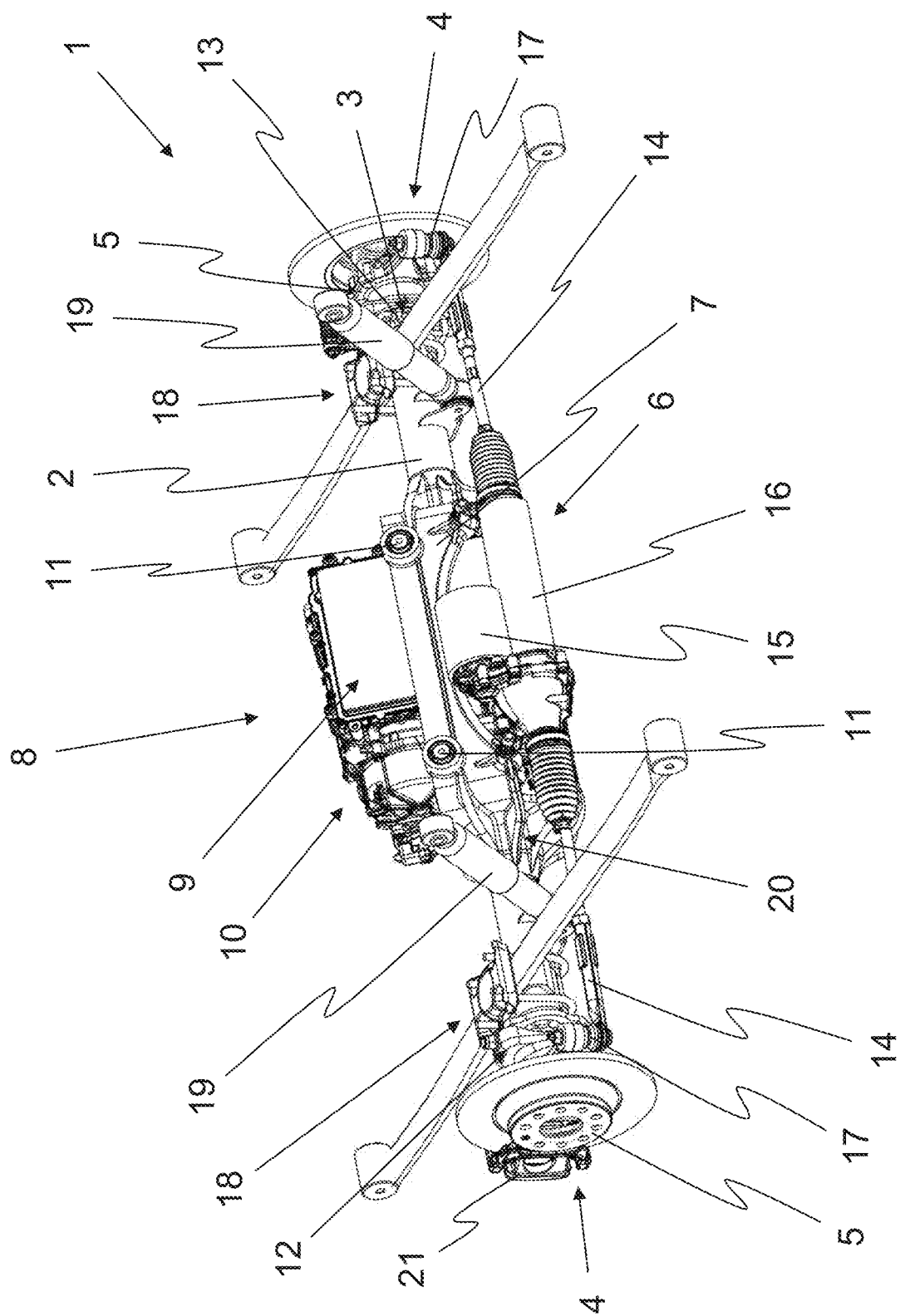

DRIVE AXLE FOR A MOTOR VEHICLE

This application claims priority from German patent application serial no. 10 2020 200 869.8 filed Jan. 24, 2020.

FIELD OF THE INVENTION

The present invention relates to a drive. In addition the invention relates to a motor vehicle.

BACKGROUND OF THE INVENTION

From DE 10 2018 120 916 A1 a steerable rear axle for a motor vehicle with a steering assembly is known, in which an axle shaft is connected to a wheel carrier by means of a steering knuckle. The rear axle has a differential gear system and a connection for a cardan shaft. Thus, the axle is designed to be driven by a drive unit arranged in the front area of the vehicle incorporating the axle.

A disadvantage here is that a cardan shaft is necessarily required for driving the axle and the axle relies on a drive unit arranged in the front area of the vehicle. Furthermore, in the case of the known rear axle it is unclear on which component the steering assembly is arranged.

SUMMARY OF THE INVENTION

Thus, the purpose of the present invention is to propose a steerable drive axle and a motor vehicle with such an axle, which overcome the drawbacks.

The objective on which the invention is based is achieved by the characteristics specified in the independent claims. Further advantageous design features emerge from the subordinate claims and from the drawing.

The drive axle according to the invention for a motor vehicle comprises an axle body, in which at least one axle shaft extends. In addition the drive axle comprises at least one wheel carrier, which is arranged on a wheel-side end of the axle body, and at least one steering assembly.

In a drive axle torque produced by a drive unit is transmitted to one or more wheels of the drive axle. A motor vehicle can usually have one or more drive axles. The wheel carrier serves to support the wheel and if necessary further components, such as a brake device. The steering assembly enables a defined steering movement of the wheel carrier and the wheel to take place. For this, the wheel carrier is rotated about a rotational axis that extends essentially perpendicularly to the axle shaft. The steering assembly can for example comprise a track-rod and/or a tie-rod for transmitting the steering movement.

Usually, an axle of a motor vehicle has two wheel carriers or wheels and is essentially mirror-symmetrical relative to a transverse center of the motor vehicle. Consequently the drive axle preferably has two wheel carriers and the axle body has two wheel-side ends. The axle shaft has for example a first axle shaft section for driving a first wheel and a second axle shaft section for driving a second wheel. The axle shaft sections can be separate from one another. For example, the steering assembly has a first track-rod for transmitting the steering movement to the first wheel and a second track-rod for transmitting the steering movement to the second wheel.

The drive axle is preferably made as a rigid axle, and in the context of the present invention this means, for example, that the axle body is formed continuously and solidly. Preferably, the axle body spans the distance between two wheel carriers of the drive axle. A rigid axle is an inexpensive form of the wheel suspension, which is often used in utility or off-road vehicles due to its high stability.

According to the invention, the drive axle is characterized in that the axle body comprises a receiving structure for receiving a drive unit and the steering assembly is connected directly to the axle body.

By virtue of the receiving structure, the drive axle can accommodate a drive unit of its own, which in particular drives the axle shaft. There is no need for a connection to a cardan shaft. The drive axle is independent of a drive unit that may be present in a front area of a vehicle. Likewise, there is no need for a separate differential gear system. The receiving structure can for example be in the form of a trough-like recess. It is conceivable for the receiving structure to be made separately and only joined to the other parts of the axle body to produce the axle body during the final assembly process. In that case the receiving structure and the other parts are preferably inseparably connected to one another, for example by welding or pressing.

Due to the direct connection of the steering assembly with the axle body, these form a kinetic unit. Thus, the steering assembly is attached to the axle and not to the auto body. In the event of oscillations of the vehicle the steering assembly moves essentially uniformly with the drive axle preferably made as a rigid axle. The mechanical loading of the steering assembly is therefore slight, or the needs of the steering assembly for mountings and articulations are slight. Accordingly, the steering assembly can be made inexpensively.

As already described, the steering assembly can for example comprise at least one track-rod, wherein the track-rod is connected to the wheel carrier. The track-rod can for example extend parallel to the axle body or axle shaft, which allows a compact configuration at the same time as a large steering angle. In the area of the drive unit recess the axle body can for example have stiffening ribs in order to ensure the stability required for holding the drive unit.

It is advantageous for the drive axle to be a rear axle. A steerable rear axle can substantially reduce the turning radius of a motor vehicle and increase the stability and safety of the motor vehicle when driving round curves. Furthermore, the drive axle can be used for example as the only drive axle of the motor vehicle or as part of an all-wheel drive system.

It is also advantageous for the axle body to comprise at least one fork joint, which is arranged at the wheel-side end. The fork joint has for example two limbs at the ends of which sockets for rotary bearings and/or bolts are arranged. The fork joint serves for articulated connection to a similar arrangement on the wheel carrier. In that way, on the one hand the steering movement of the wheel carrier is made possible. For example, by virtue of the arrangement of the joint sockets the fork joint provides a degree of rotational freedom about a rotational axis, which is preferably defined by the line connecting the joint sockets. On the other hand, in particular a recess between the limbs allows the axle shaft to be passed through, so that torque through the axle shaft can be transmitted to a wheel arranged on the wheel carrier. If the axle body has two wheel-side ends, fork joints can be arranged at each of the two ends.

In an advantageous further development of the drive axle, the steering assembly comprises an actuator, in particular with an electric motor. The actuator allows active steering of the drive axle, which for example depends on the movement of a steering wheel by a driver. Besides an electric motor, hydraulic or pneumatic actuation of the actuator is conceivable. The actuator comprises for example a gear system or is connected to a gear system which transmits movements of the actuator, for example by way of one or more track-rods, to the wheel carrier or carriers.

It is particularly advantageous for the steering to comprise a spindle transmission. The spindle transmission is for example characterized in that rotational movement, for example of an electric motor, is converted into translation, for example of a threaded bar. The threaded bar can in turn be part of the track-rod already described—or be connected to it. The spindle transmission has a self-locking action. In the event of a failure, for example of the above-described actuator, this has the advantage that the track of the vehicle remains essentially constant so that no random steering movements take place. This improves the safety of the vehicle.

A further advantage is obtained if, with the drive axle arranged as intended, the steering assembly as viewed from the side is behind the axle shaft relative to the longitudinal direction of the vehicle. In that way the structural space available behind the axle shaft is utilized efficiently. As already indicated, the steering assembly can for example extend essentially parallel to the axle body. It should be pointed out that as viewed from the side, the steering assembly, particularly its steering gear system, can also be arranged in front of the axle shaft relative to the longitudinal direction of the vehicle.

In a further advantageous embodiment of the drive axle, the steering assembly is arranged in the receiving structure. In that way synergies can be used in the production of the axle body and the receiving structure. The receiving structure must be designed to accommodate a drive unit with holding elements. This involves only little additional cost and effort to provide holding elements for the steering assembly, which also needs them. Furthermore, the receiving structure has to be very stable. As already described, this can be ensured for example by stiffening ribs. Thanks to its increased stability the receiving structure is well suited for accommodating the steering assembly.

For a uniform steering angle, for example of two wheels or wheel carriers, it is advantageous for the steering assembly to be arranged centrally between the wheel carriers in a transverse direction of the vehicle. The same is true for a drive unit, if any, in relation to a uniform driving action. Accordingly, it is best to arrange the steering assembly and the receiving structure in a similar position in the transverse direction of the vehicle. Further synergies can sometimes be obtained by using a common energy supply for any drive unit and the steering assembly. It is also conceivable to provide a common control system for any drive unit and the steering assembly.

Moreover, it is advantageous for the axle shaft to be in the form of a cardan shaft, wherein the axle shaft preferably comprises at least one joint, in particular a universal joint, a double-universal joint and/or a constant-velocity joint. In this context the term cardan joint is understood to mean a shaft with a joint as mentioned above, and not a shaft extending in the longitudinal direction of a vehicle that connects a drive unit at the front to a rear axle. The axle shaft, designed as a cardan shaft with the joint, enables torque to be transmitted to a wheel on the one hand, and on the other hand enables steering movements to be imparted to the wheel with comparatively large steering angles. For this a universal joint is an inexpensive option, whereas a double-universal joint or a constant-velocity joint, although they are more expensive, enable more uniform torque transmission. In the case of a drive axle with two wheel carriers, the axle shaft also has two joints. If the axle shaft is divided into a first axle shaft section and a second axle shaft section, the axle shaft sections preferably both have at least one joint.

An advantageous supplementary feature for the drive axle is at least one spring device, in particular at least one leaf spring. For example, the spring device forms a connection to a body of a motor vehicle. Thus, between the body and the drive axle there is some oscillation damping. This reduces the mechanical loading of the body and all the elements present in the body, for example when the road is uneven. The drive axle preferably has two spring devices. In particular, the spring devices are arranged close to the wheel carriers and mirror-symmetrically relative to the middle of the drive axle.

A leaf spring can take particularly high loads and is therefore especially suitable for utility and off-road vehicles. The leaf spring can for example consist of a plurality of individual spring strips arranged one above another, which for example have different lengths. In such a case friction between the strips also produces a certain damping action.

Alternatively to connecting an auto body by way of leaf springs, connection by way of a longitudinal control arm and a Panhard rod or connection by way of a Watt linkage are also conceivable.

Advantageous for the drive axle is, furthermore, a damper arranged on the axle body. Thanks to the damper, oscillations of a vehicle body are damped and therefore subside in a short time. This improves the driving properties and the stability of the vehicle. Preferably, the drive axle has two dampers. In particular, these are arranged mirror-symmetrically relative to the middle of the drive axle. For example, the dampers can be arranged immediately adjacent to the spring devices. The damper(s) can for example be in the form of hydraulic dampers.

In another advantageous further development of the drive axle, a drive unit is arranged in the receiving structure. The drive unit serves to drive the axle shaft, or axle shaft section if the axle shaft is divided into first and second axle shaft sections. By way of the axle shaft, for example, wheels and therefore a motor vehicle in which the drive axle is arranged, are driven. It is conceivable that for better holding, the drive unit is spanned by a stirrup clamp, which in turn can be connected to the axle body. The drive unit can for example comprise a gear system. Likewise the drive unit can comprise a control unit. In principle any form of compact drive unit is suitable.

However, it is particularly advantageous if the drive unit comprises at least one electric motor. Electric motors are characterized by high maximum power with a compact structure. Various electric motor configurations are conceivable. For example, the electric motor can be in the form of a permanently energized or remotely energized direct-current motor. Construction as a reluctance motor is also conceivable. A design in the form of a reluctance motor is also conceivable. It is also conceivable that the drive unit has two electric motors, wherein a first electric motor drives a first axle shaft section and a second electric motor drives a second axle shaft section. The drive unit can for example comprise cooling elements for dissipating heat generated by losses.

The drive unit can be attached on the axle body in various ways. In the simplest case the drive unit is fixed directly on the axle body, whereby simply designed, inexpensive and effective attachment is ensured. It is particularly advantageous for the drive unit to be attached to the axle body by means of rubber mountings. As a rule, a rubber mounting comprises an elastomer surrounded by a sleeve, which owing to its elasticity allows movements not only in a main degree of freedom but in other degrees of freedom as well. In the present context, however, the rubber mounting is chosen mainly because of the damping action of the elastomer. In this case rubber mountings serve to promote acoustic decoupling of the drive unit from the axle body or the receiving structure of the axle body. To put it differently, any transmission of vibrations between the drive unit and the axle body is substantially suppressed. A good compromise between cost-efficiency and stability is achieved when the drive unit is attached on the axle body, for example by means of four rubber mountings.

Moreover, it is advantageous for the drive unit to comprise a distributor gear system. By means of the distributor gearing different torques can be transmitted to the individual wheels of the axle. This can improve the driving properties of a vehicle. In particular the electric motor can be connected to the distributor gearing, in such manner that the torque of the electric motor is distributed between a first axle shaft section and a second axle shaft section. The distributor gearing can for example be controlled electronically and for that purpose it can be connected to an appropriate control system.

The motor vehicle according to the invention with a drive axle according to the invention is characterized in that the drive axle is designed in accordance with the foregoing description. In this, the features mentioned can exist individually or in any desired combination. For example, the drive axle according to the invention can be the rear axle of the motor vehicle. As already described, in that case there is no need for a cardan shaft which connects a drive unit arranged in a front area of the motor vehicle to the rear axle. This creates free space that can be used otherwise, for example for a battery.

The drive axle can be the only driven axle of the motor vehicle. However, it is also conceivable that the vehicle has more than one driven axle. Thus, the drive axle can be part of an all-wheel drive system. The drive axle can be connected to a body of the motor vehicle, for example by means of leaf springs. Alternatively, it is also conceivable that the drive axle and the body are connected by means of a longitudinal link and a Panhard rod, or by a Watt linkage.

With the steerable drive axle as the rear axle of the vehicle, the advantage of a smaller turning circle is obtained. Preferably, the motor vehicle comprises a source of electrical energy. The energy source is for example in the form of a battery.

It is also conceivable to couple the drive axle according to the invention, with its electric motor in the motor vehicle, to a further drive unit such as an internal combustion engine. In such a case the further drive unit can drive a further axle. It is conceivable that a generator of the internal combustion engine supplies the electric motor of the drive axle with current.

BRIEF DESCRIPTION OF THE DRAWINGS

Further advantages of the invention are described in the following example embodiment. The sole FIGURE shows an isometric view of a drive axle according to the invention.

DETAILED DESCRIPTION OF THE PREFERRED EMBODIMENTS

The drive axle 1 is basically designed in accordance with the foregoing description. The example embodiment shows a drive axle 1 in the form of a rigid axle. The drive axle 1 has an axle body 2 in which an axle shaft 3 extends. In this case the axle body 2 has two wheel-side ends 4, on each of which a wheel carrier 5 is arranged. The wheel carriers 5 serve to support wheels (not shown). In addition the drive axle 1 comprises a steering assembly 6. The drive axle 1 is characterized in that it comprises a receiving structure 7 for accommodating a drive unit 8, and the steering assembly 6 is connected directly to the axle body 2. Thus, the steering assembly 6 is in any case attached to the axle and in particular is not designed to be arranged on a body of a motor vehicle.

In this example the drive unit 8 is arranged in the receiving structure 7. The receiving structure 7 is for example a trough-like widened and recessed part of the axle body 2. The drive unit 8 comprises for example an electric motor 9 and a distributor gear system 10. The drive unit 8 is attached to the axle body 2 by means of rubber mountings 11. In that way the drive unit 8 and the axle body 2 are acoustically decoupled.

At its wheel-side ends 4 the axle body 2 has in each case a fork joint 12. The fork joints 12 enable a well-defined steering movement of the wheel carriers 5. The axle shaft 3 passes through the fork joints 12 to the wheel carriers 5. In order to enable on the one hand the steering movement of the wheel carriers 5 and on the other hand torque transmission to the wheels, the axle shaft 3 is designed as a cardan shaft with a respective articulated joint 13 in the area of each wheel-side end 4 of the axle body 2. The joint 13 is for example in the form of a universal joint or cardan joint.

In this example embodiment the steering assembly 6 is arranged on the receiving structure 7. The steering assembly 6 comprises a through-going track-rod 14 by means of which it is connected to the wheel carriers 5. The steering assembly 6 comprises an actuator 15 and a spindle transmission 16 which converts a rotational movement of the actuator 15 into a translation of the track-rod 14. In turn, the translation of the track-rod 14 brings about the steering movement of the wheel carrier 5 about the rotational axes defined by the fork joints 12. The length of the track-rod 14 is for example adjustable in the direction of the two wheel carriers 5, so that a track adjustment of the drive axle 1 can be carried out. The track-rod is connected to the wheel carriers 5, for example by means of rotary joints 17.

The drive axle 1 also comprises two spring devices 18, which in this case are in the form of leaf springs. The spring devices 18 are arranged immediately adjacent to the wheel-side ends 4 on the axle body 2. The spring devices 18 serve to provide a connection to a body of a vehicle (not shown) and vibration isolation between the body and the axle drive 1. To dampen the oscillations produced by the spring devices 18, the drive axle 1 also has two dampers 19 which are arranged on the axle body 2 immediately adjacent to the spring devices 18. The dampers 19 are for example in the form of hydraulic dampers 19.

To improve the stability of the drive axle 1, the receiving structure 7 has for example stiffening ribs 20. On the wheel carriers 5 there are also, for example, brake devices 21.

The present invention is not limited to the example embodiment illustrated and described. Deviations within the scope of the claims are likewise possible, as also is a combination of its features.

INDEXES

1 Drive axle
2 Axle body
3 Axle shaft
4 Wheel-side end

5 Wheel carrier
6 Steering assembly
7 Receiving structure
8 Drive unit
9 Electric motor
10 Distributor gear system
11 Rubber mounting
12 Fork joint
13 Articulated joint
14 Track-rod
15 Actuator
16 Spindle transmission
17 Rotary joint
18 Spring device
19 Damper
20 Stiffening ribs
21 Brake device

The invention claimed is:

1. A drive axle for a motor vehicle, the drive axle comprising:
   an axle body in which at least one axle shaft extends,
   at least one wheel carrier, and the at least one wheel carrier being arranged on a wheel-side end of the axle body,
   at least one steering assembly having a drive an actuator that steers the at least one wheel carrier to steer the drive axle,
   the axle body further comprising a receiving structure which receives a drive unit, the drive unit driving the at least one axle shaft and the receiving structure being directly connected to and wholly supported by the axle body, and
   the steering assembly being directly connected to the axle body centrally along the drive axle.

2. The drive axle according to claim 1, wherein the drive axle is a rear axle.

3. The drive axle according to claim 1, wherein the axle body has at least one fork joint which is arranged at the wheel-side end.

4. The drive axle according to claim 1, wherein the steering assembly comprises the actuator that is coupled to the at least one wheel carrier, the actuator being fixed to the axle body and actuatable to transmit steering movements to the at least one wheel carrier.

5. The drive axle according to claim 4, wherein the actuator is an electric motor and actuation of the electric motor transmits the steering movements of the actuator, via track rods, to the at least one wheel carrier.

6. The drive axle according to claim 1, wherein the steering assembly comprises the actuator and at least one spindle transmission, the actuator is rotatable and rotationally drives the at least one spindle transmission which converts rotational movement of the actuator into translation of a track-rod connected to the at least one wheel carrier to bring about steering movement of the at least one wheel carrier.

7. The drive axle according to claim 1, wherein when the drive axle is viewed from a lateral side of the vehicle, the steering assembly is located behind the axle shaft in relation to a longitudinal direction of the vehicle.

8. The drive axle according to claim 1, wherein the steering assembly is arranged on the receiving structure.

9. The drive axle according to claim 1, wherein the axle shaft is a cardan shaft such that the axle shaft has at least one articulated joint.

10. The drive axle according to claim 9, wherein the at least one articulated joint is one of a universal joint, a double-universal joint or a constant-velocity joint.

11. The drive axle according to claim 1, further comprising at least one spring device.

12. The drive axle according to claim 11, wherein the at least one spring device comprises two leaf springs that are secured to the axle body and extend in a longitudinal direction of the vehicle.

13. The drive axle according to claim 1, further comprising at least one damper which is arranged on the axle body.

14. The drive axle according to claim 1, wherein the drive unit is arranged in the receiving structure.

15. The drive axle according to claim 14, wherein the drive unit comprises at least one electric motor, wherein the drive unit and the at least one steering assembly have a common energy supply.

16. The drive axle according to claim 14, wherein the drive unit comprises an electric motor and is attached by rubber mountings to the receiving structure which is directly connected to the axle body such that the electric motor is located vertically higher than the at least one axle shaft.

17. The drive axle according to claim 14, wherein the drive unit comprises a distributor gear system which transmits torque from the drive unit to wheels of the drive axle.

18. The drive axle according to claim 14, wherein the drive axle is a rigid axle.

19. A motor vehicle with a drive axle, wherein the drive axle includes:
   an axle body in which at least one axle shaft extends,
   at least one wheel carrier, and the wheel carrier being arranged on a wheel-side end of the axle body,
   at least one steering assembly having a drive an actuator that comprises an electric motor which is actuatable to steers the at least one wheel carrier,
   the axle body comprises a receiving structure for accommodating a drive unit that comprises another electric motor that rotatably drives the at least one axle shaft, and the receiving structure being directly connected to and wholly supported by the axle body, and
   the steering assembly is connected directly to the axle body centrally between axially opposite ends of the axle body.

20. A drive axle for a motor vehicle, the drive axle comprising:
   an axle body in which at least one axle shaft extends therethrough, at least first and second wheel carriers, the first wheel carrier being arranged on a first wheel-side end of the axle body and the second wheel carrier being arranged on a second wheel-side end of the axle body opposite the first wheel-side end,
   a steering assembly having a first electric motor for steering the first and the second wheel carriers,
   the axle body further comprising a receiving structure for accommodating a drive unit having a second electric motor that is actuatable to transmit drive torque to the first and the second wheel carriers, and the receiving structure being directly connected to and wholly supported by the axle body so that the steering assembly moves essentially uniformly with the drive axle when the vehicle experiences oscillations,
   the axle body having stiffening ribs, adjacent a drive unit recess, in order to ensure the stability required for holding the drive unit,
   the steering assembly extending essentially parallel to the axle body, and the steering assembly being directly connected to the axle body for steering the first and the second wheel carriers, the steering assembly being connected to the axle body at a middle of the drive axle between the first and the second wheel carriers.

\* \* \* \* \*